March 9, 1954   W. RAVEN   2,671,344
METHOD OF MEASURING THE CLEAVABILITY OF BRITTLE MATERIALS
Filed May 23, 1952
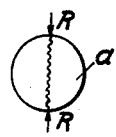
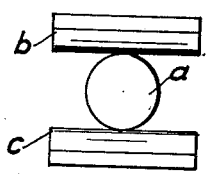
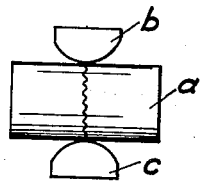
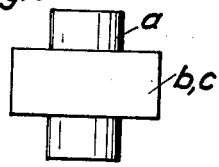
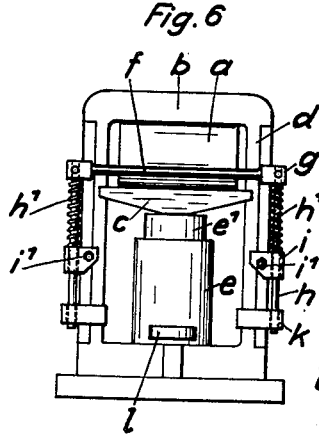
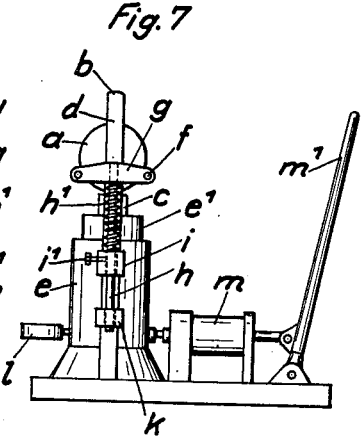
Inventor
Werner Raven
By Frank W. Dahm
Attorney Patented Mar. 9, 1954

2,671,344

UNITED STATES PATENT OFFICE 2,671,344

METHOD OF MEASURING THE CLEAVABILITY OF BRITTLE MATERIALS

Werner Raven, Braunschweig, Germany

Application May 23, 1952, Serial No. 289,460

1 Claim. (Cl. 73—94)

This invention relates to certain improvements in the testing of materials.

It is an object of the present invention to provide a method for determining the cleavability of brittle materials, more particularly, of concrete.

A special object of the invention is to provide a method for measuring the tensile strength of brittle materials which is simpler and cheaper than the known ones.

According to the present invention this is achieved by inserting columns or test bars of a polygonal or, in an extreme case, circular or elliptical cross section between the pressure transmission bodies of a press, in such a way that in the longitudinal position of the bar either two opposite longitudinal lines of the polygonal bar or two opposite parallel lines of the cylinder are engaged by said pressure transmission bodies. It is also possible to test the bars in a transverse position between the pressure transmission surfaces of a press, i. e. crosswise to the longitudinal extension of the presser surfaces.

The invention will be better understood by reference to the following detailed description in connection with the accompanying drawing showing by way of example and purely schematically some arrangements for carrying out the method according to the invention and in which:

Fig. 1 is a side view of a test body,

Fig. 2 is an end view thereof,

Fig. 3 is a view showing the test body engaged between the jaws or pressure transmission surfaces of a press, Fig. 4 is a view at right angles to Fig. 3, Fig. 5 is a plan view of Fig. 3, Fig. 6 is a front view of a press arrangement for carrying out the invention, and Fig. 7 is a side view thereof.

Similar reference numerals denote similar parts in the different views.

Referring now to the drawing in greater detail, and first to Figs. 1 and 2, it will be seen that a cylindrical test bar $a$ is exposed between the parallel lines 1—2 and 3—4 to a pressure strain produced by a hydraulic press, the resultant R of this strain intersecting with the axis of the cylinder $a$ at right angles thereto. When the limit of stability is reached, the surface of fracture 1, 2, 3, and 4 will be produced, by which the test body breaks down into two half columns of equal size.

The same test bar is shown in Figs. 3 to 5, being engaged between the two pressure transmission surfaces $b$, $c$, of a press, in a position crosswise of the surfaces $b$ and $c$ for test. The said presser surfaces $b$, $c$ are substantially cylindrically shaped, as shown. When the limit of stability is reached, the fracture will occur at right angles to the axis of the bar in the form of a circular surface, whereby the test body breaks down into two short columns. The direction of the resultant R in all cases passes through the center of gravity of the test bar.

Referring now to Figs. 6 and 7, the press arrangement for carrying out the testing method according to the invention comprises a frame $d$ having an upper thrust block bridge $b$, a hydraulic cylinder $e$ and press piston or ram $e'$, a lower thrust block $c$ which is swingable in a plane passing through the axis of the cylinder, and a resilient supporting traverse, including a pair of longitudinal bars $f$, a pair of cross bars $g$ which are guided on the vertical columns of the frame $d$, a pair of supporting rods $h$ resiliently bearing on adjustable abutments $i$, which are adjustable for height on the frame $d$ and are fixable on the same by means of clamping screws $i^1$, springs $h^1$ surrounding the rods $h$ and being inserted between the adjustable and fixable abutments $i$ and the cross bars $g$, said springs bearing on the abutments $i$ and exerting pressure on the cross bars $g$ from below, and additional guides $k$ for guiding the lower ends of the rods $h$ extending through the abutments $i$. It is also contemplated to adjust the abutments $i$ on frame $d$ on unscrewing of the fixing screws $i^1$ by screwing down the threaded supports $h$ into the abutments $i$ which are provided with female thread, as the abutments $i$ after their adjustment are again fastened on the frame $d$. The piston $e'$ can be forced upwards by operation of a hydraulic pump $m$ through a lever $m'$. The pump $m$ communicates with the hydraulic cylinder $e$, the hydraulic pressure being indicated by an indicator $l$.

The cleavage test is carried out as follows:

The test body $a$ is put on the two longitudinal bars $f$ of the resilient supporting traverse and raised by the springs $h^1$ so as to engage the upper thrust block $b$. Now the pump $m$ is operated by its its hand lever $m'$ to force power liquid into the press cylinder $e$, whereby the ram $e'$ together with the lower thrust block $c$ is raised against the test body and the same is cleaved into two halves by a corresponding rise of the pressure. The pressure required for cleaving the test body can be read from the load indicator $l$.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claim.

What is claimed is:

A method of determining the cleavability of brittle materials which comprises the steps of providing a solid cylindrical specimen of said material, progressively compressing said specimen between pressure members having convex work engaging surfaces that are arcuate in cross section and oppositely curved until the specimen ruptures, and measuring the pressure.

WERNER RAVEN.

References Cited in the file of this patent

UNITED STATES PATENTS

| Number | Name | Date |
| --- | --- | --- |
| 2,041,869 | Smith et al. | May 26, 1936 |
| 2,414,550 | Patch | Jan. 21, 1947 |
| 2,471,227 | Marshall | May 24, 1949 |
| 2,565,424 | Forssell | Aug. 21, 1951 |

FOREIGN PATENTS

| Number | Country | Date |
| --- | --- | --- |
| 387,542 | Germany | Dec. 29, 1923 |